3,183,061
XENON TETRAFLUORIDE AND PROCESS OF MAKING SAME

Howard H. Claassen, Wheaton, Henry Selig, Chicago, and John G. Malm, Naperville, Ill., assignors to the United States of America as represented by the United States Atomic Energy Commission
No Drawing. Filed Sept. 11, 1962, Ser. No. 222,975
4 Claims. (Cl. 23—205)

This invention deals with a new xenon compound, xenon tetrafluoride, and a method of making it.

It has been the predominant opinion in the art that the so-called noble gases are nonreactive and thus do not form any compounds with other elements. It has been found now, however, that xenon does react with fluorine gas at elevated temperature, forming xenon tetrafluoride.

The process of this invention comprises reacting xenon and fluorine gases at elevated temperature, whereby xenon tetrafluoride is formed, and cooling the tetrafluoride to room temperature, whereby it is condensed as a solid.

In order to obtain a quantitative reaction, fluorine is preferably added in an amount in excess of that stoichiometrically required. The temperature may range between 350 and 450° C., but preferably is about 400° C. After completed reaction, which usually is after about 20 minutes, the product is cooled to room temperature by immersion of the reaction container in a water bath. The excess fluorine gas is then pumped off while the container is cooled to −78° C. with Dry Ice. The yield in all instances tested was 100% with respect to the quantity of xenon used.

Xenon tetrafluoride is a colorless solid at room temperature; it decomposes upon heating. Its vapor pressure at −78° C. was found to be negligible; at room temperature (about 25° C.) it was approximately 3 mm. of mercury. Xenon tetrafluoride is chemically stable at room temperature and sublimes readily. When xenon tetrafluoride was sealed under vacuum in a glass tube, the compound had grown into large colorless crystals within a few hours. Xenon tetrafluoride does not melt at temperatures up to 100° C. It is insoluble in and nonreactive with n-fluoroheptane.

The process of this invention can be used for the separation of xenon from other noble gases, such as helium, argon and krypton, which were found not to react with fluorine at the conditions of this process. The xenon tetrafluoride can serve as a convenient means of shipping xenon and/or fluorine in compact form.

In the following, an example is given illustrating the process and new compound of this invention.

Example

Xenon gas was introduced into a weighed nickel container and the weight of xenon was determined from the weight difference. Thereafter fluorine was passed into the container with the container at −195° C. Fluorine was present in a quantity in excess of the four atoms necessary per one atom of xenon. The closed container was heated to 400° C. and held there for 25 minutes, whereafter the container was cooled to room temperature. The container was then immersed in Dry Ice (−78° C.) and a vacuum was applied; in this step the excess fluorine gas was removed. This fluorine gas was pumped through a container immersed in liquid nitrogen for the purpose of removing any nonreacted xenon; however, there was no unreacted xenon present. (When, in a separate test, pure xenon gas passed into a container cooled in liquid nitrogen, all of its was condensed.)

After removal of nonreacted, excess, fluorine gas the container was weighed again and from the differences of weights of the container with the xenon before reaction and the weight after reaction and removal of excess fluorine, the amount of fluorine consumed was calculated. Also, from the amounts of fluorine, reacted and xenon introduced, the ratio of fluorine:xenon in the compound, and thus its formula, was determined. Four runs were carried out as just described. The results are summarized in the following table:

| Run No. | Xe added, millimoles | $F_2$ consumed, millimoles | Atom ratio in product, F/Xe |
|---|---|---|---|
| 1 | 2.248 | 4.558 | 4.05 |
| 2 | 1.806 | 3.539 | 3.92 |
| 3 | 1.944 | 3.808 | 3.91 |
| 4 | 2.745 | 5.453 | 3.97 |

The ratios determined of fluorine:xenon in all four runs were close to four, which strongly indicates the formula $XeF_4$ for the product.

To confirm the formula $XeF_4$ for the product, some of it was introduced into a weighed container and excess hydrogen gas was added thereto. The gas mixture in the closed container was heated to about 400° C., whereby the product was decomposed, forming xenon and hydrogen fluoride. The container with the gas mixture was then immersed in liquid nitrogen and a vacuum was applied to remove any excessive nonreacted hydrogen gas. The pumped-off gas was passed first into a U-tube cooled by a bath of isopentane maintained at its melting point of −159° C., whereby the hydrogen fluoride was condensed, and then into a liquid-nitrogen-cooled U-tube (−195° C.) for condensation of the xenon. The hydrogen fluoride was weighed and hydrolyzed in a known quantity of sodium hydroxide solution, and its quantity was then determined both by back-titration and fluorine analysis. The condensed xenon was also weighed and checked spectrometrically for purity; it was found to be 100% xenon.

In the confirmation test, 0.4006 gram of xenon tetrafluoride was used. It was found to contain 0.2507 gram of xenon (theoretical content: 0.2537 gram) and 0.1435 gram of fluorine (theoretical content: 0.1469 gram). After decomposition of the xenon tetrafluoride with hydrogen gas, 7.53 milliequivalents of hydrogen fluoride had been formed, the theoretical amount, on the basis of 0.4006 gram of $XeF_4$, being 7.73 milliequivalents.

Some of the xenon tetrafluoride formed was reacted with excess xenon gas at 400° C., and a lower fluoride, apparently $XeF_2$, was formed thereby.

It will be understood that the invention is not to be limited to the details given herein but that it may be modified within the scope of the appended claims.

What is claimed is:

1. A process of preparing xenon tetrafluoride, comprising reacting xenon gas and fluorine gas at between 350 to 450° C. for about 20 minutes and then rapidly cooling the product formed by immersion in a water bath to room temperature.

2. A process of preparing xenon tetrafluoride, comprising mixing xenon gas with an amount of fluorine gas in excess of that stoichiometrically required, heating the mixture to a temperature between 350 and 450° C. for approximately 20 minutes, whereby all xenon reacts with fluorine to form xenon tetrafluoride, cooling the reaction mixture rapidly to room temperature by immersion in a water bath and removing the excess fluorine gas by evacuation while immersed in Dry Ice.

3. The process of claim 2 wherein the reaction temperature is about 400° C.

4. As a new composition of matter, xenon tetrafluoride.

References Cited by the Examiner

Chemical Society Proceedings, June 1962, page 218.

Mellor: "Compehensive Treatise on Inorganic and Theoretical Chemistry, Supp. II, part 1 (1956), page 65.

MAURICE A. BRINDISI, *Primary Examiner.*